Nov. 27, 1962  F. MACKNIESH  3,065,715
TROLLEY ASSEMBLY
Filed Dec. 13, 1960
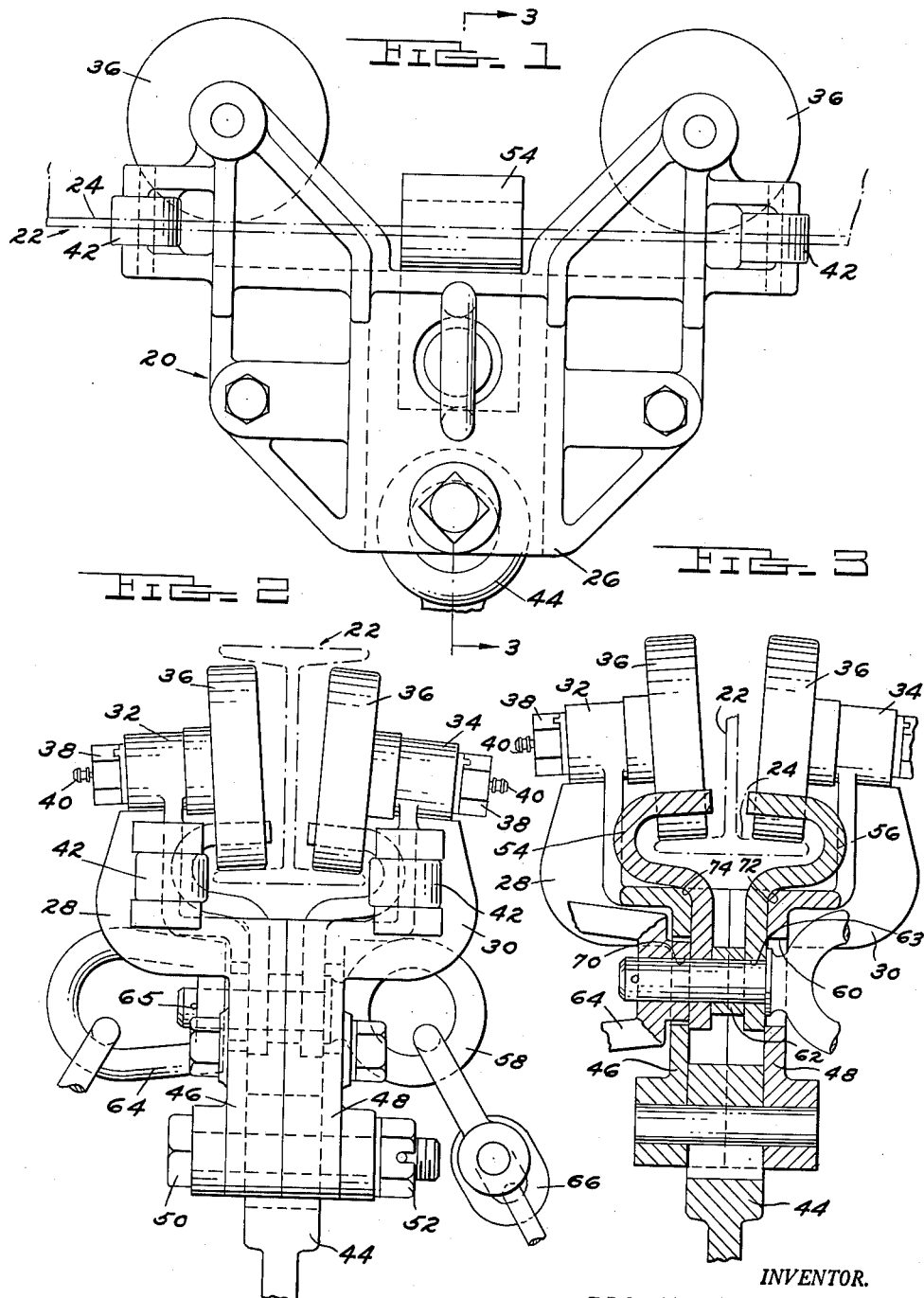
INVENTOR.
FRANK MACKNIESH
BY
Burton & Parker
ATTORNEYS

United States Patent Office 3,065,715
Patented Nov. 27, 1962

3,065,715
TROLLEY ASSEMBLY
Frank Mackniesh, 25812 Salem Road,
Huntington Woods, Mich.
Filed Dec. 13, 1960, Ser. No. 75,584
5 Claims. (Cl. 105—154)

This invention relates to trolley assemblies, and in particular to a trolley assembly for use with a trolley track having an upwardly facing trolley wheel riding surface, which assembly has a safety member overhanging the wheel riding surface of the track to suspend an object therefrom should the main suspension means on the trolley assembly, or the trolley assembly itself, fail.

Trolley assemblies riding along an overhead trolley track have been extensively used in conjunction with moving assembly lines. These assemblies provide a convenient means for suspending portable welding equipment and the like near such assembly lines where they are used to perform repeated operations on parts moving along the line. In such an application the trolley assembly must be so designed and constructed that it will function without interruption for extended periods of tortuous use.

Most of this so-called portable welding equipment is much too heavy to be carried about by the person operating it. In addition, it represents a large capital investment. Therefore the trolley assembly from which such equipment is suspended must ensure against accident to the equipment and/or its operator as far as is possible. If the trolley assembly should fail and the equipment fall to the floor, the expenses for repairs and losses due to down time on the assembly line would be appreciable. Even more important if the equipment were to fall on a workman, the results could be disastrous.

Consequently, the trolley assembly to which this invention relates includes means to positively prevent equipment suspended therefrom from falling in the event of failure of some portion of the assembly. This safety means is both simple and rugged and contains no moving parts. With the assembly positioned on the trolley track the object to be suspended therefrom is connected to the main frame of the assembly. Another connection is then made to the object from the safety member, providing an independent means for suspending the object should the main frame, trolley wheels, main suspension chain, or the like, fail.

It is the primary object of this invention to provide a trolley assembly for use with a trolley track having an upwardly facing trolley wheel riding surface, such assembly having means for suspending an object therefrom and an independent safety member overhanging the trolley wheel riding surface of the track to drop thereon and suspend the object in the event of failure of the remainder of the assembly.

Other objects, advantages and meritorious features will more fully appear from the description, claims and accompanying drawings, wherein:

FIG. 1 is a side view of the invention showing the trolley assembly positioned along a trolley track.

FIG. 2 is an end view of the trolley assembly and track shown in FIG. 1.

FIG. 3 is a cross-sectional view taken along line 3—3 of FIG. 1.

Referring now to the drawings, it can be seen that the invention comprises a trolley assembly 20 positioned along a trolley track 22 adapted to be suspended overhead by means not shown; the track having an upwardly facing trolley wheel riding surface 24.

The trolley assembly 20 comprises a frame 26, which may be constructed in two separate, identical parts 28 and 30 shown in FIGS. 2 and 3. The upper portions 32 and 34 of frame parts 28 and 30 extend upwardly along the wheel riding surface 24 of track 22 and have wheels 36 mounted thereon to overlie and ride along the wheel riding surface 24. The wheels 36 may be secured to the frame by means of nuts 38 threaded on to the ends of the wheel shafts (not shown). Grease fittings 40 are provided to lubricate the bearings of the wheels 36. Rollers 42 mounted on the upper frame portions 32 and 34 are positioned adjacent the lateral edges of the wheel riding surface 24 to guide the trolley assembly 20 along the trolley track 22.

Means 44 for suspending an object from the trolley assembly 20 is located between the lower portions 46 and 48 and may be mounted therein by a bolt 50 and nut 52 which also serves to rigidly secure frame parts 28 and 30 together.

A pair of essentially J-shaped safety arms 54 and 56 are positioned between the wheels 36 and extend in spaced relation above and over the wheel riding surface 24 of track 22. The arms 54 and 56 are independent of frame parts 28 and 30 but rest within the frame and are supported by it in the position shown. Arms 54 and 56 may be secured together within frame 26 by means of an eyebolt 58 extending through a recess 60 in frame 26 through aligned recesses 68 and 70 in the arms, and biased against the arms by means of another ring-like member 64 secured to the opposite end of eyebolt 58, as by a pin or the like 65. A spacer washer 62 may be disposed between the arms and through which the bolt 58 extends.

The arms 54 and 56 are supported in the position shown by being squeezed between the frame members 46 and 48 and by overlying the frame members at the faces 72 and 74.

The object to be suspended from the trolley assembly 20 may be secured to suspending means 44 by means of a chain or the like (not shown). Similarly, a second chain or the like 66 is secured to the safety arms 54 and 56 by means of members 58 and 64. In the event of failure of the first suspending chain, the second chain 66 would safely suspend the object, preventing it from falling to the floor. If, on the other hand, some portion of the trolley assembly itself should fail, safety arms 54 and 56 would drop down upon the wheel riding surface 24 of trolley track 22, and the object would be again suspended from the second chain 66 attached to the safety arms by means of members 58 and 64.

What is claimed is:

1. A trolley assembly for suspending an object from a trolley track having a trolley wheel riding surface comprising: a frame; a plurality of wheels mounted on said frame in spaced apart relation longitudinally of and in rolling arrangement with said wheel riding surface of the track; main suspension means connected to said frame for suspending an object therebelow; safety arm means for carrying said suspended object in the event of failure of said frame, wheels or main suspension means; means connecting the safety arm means to the frame fixing the arm means against movement relative to the frame; said arm means including an integral portion overhanging in spaced relation said wheel riding surface of the track and disposed between said wheels; and auxiliary suspension means connected to said safety arm means and said object for suspending the object from the track.

2. The invention as defined in claim 1 characterized in that said safety arm means is connected to the frame operatively independent of said main suspension means, with said portion of the arm means overhanging the wheel riding surface of the track adapted to drop against said wheel riding surface to suspend the object from the track in the event of failure of said frame or said wheels.

3. The invention as defined in claim 1 characterized in that said safety arm means is mounted on and carried by said frame and said auxiliary suspension means is operatively independent of the main suspension means to suspend an object from the frame in the event of failure of said main suspension means.

4. The invention as defined in claim 1 characterized in that said assembly includes a plurality of rollers mounted on the frame adjacent the marginal edges of said wheel riding surface of the track to abut said edges in rolling engagement upon lateral movement of said assembly with respect to the track.

5. A trolley and track assembly comprising: a trolley track of substantially I-beam shape having a lower horizontal flange portion and an upstanding central web portion, with said flange defining an upwardly facing wheel riding surface on opposite sides of the web; a frame; a plurality of wheels mounted on said frame in spaced apart relation longitudinally of and in rolling engagement with the wheel riding surface of the track; main suspension means connected to said frame for suspending an object from the track; a pair of safety arms having integral portions embracing the lower horizontal track flange and overhanging in spaced relation said wheel riding surface of the track, said arm portions terminating adjacent said upstanding web and disposed between said wheels; means connecting the safety arms with the frame fixing the arms against movement relative to the frame; and auxiliary suspension means connected to said safety arms and said object for suspending the object in the event of failure of said frame, wheels or main suspension means.

References Cited in the file of this patent

UNITED STATES PATENTS

| | | |
|---|---|---|
| 1,035,922 | True | Aug. 20, 1912 |
| 1,394,318 | McGuire | Oct. 18, 1921 |
| 1,744,482 | Mead | Jan. 21, 1930 |